United States Patent
Suppes et al.

(10) Patent No.: US 8,861,827 B2
(45) Date of Patent: Oct. 14, 2014

(54) SYSTEM AND METHOD FOR DETERMINING CONFIDENCE MEASUREMENTS OF SINGLE VOLUME ELEMENTS IN COMPUTER TOMOGRAPHY

(75) Inventors: Alexander Suppes, Garbsen (DE); Eberhard Neuser, Wunstorf (DE); Nils Rothe, Hannover (DE); Anja Frost, Hannover (DE); Michael Hoetter, Gehrden (DE)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 13/406,841

(22) Filed: Feb. 28, 2012

(65) Prior Publication Data

US 2013/0223710 A1    Aug. 29, 2013

(51) Int. Cl.
*G06K 9/00* (2006.01)

(52) U.S. Cl.
USPC .......................................... 382/131; 382/128

(58) Field of Classification Search
None
See application file for complete search history.

(56) References Cited

U.S. PATENT DOCUMENTS

| | | | |
|---|---|---|---|
| 4,993,075 A * | 2/1991 | Sekihara et al. | 382/131 |
| 5,907,594 A | 5/1999 | Lai | |
| 6,813,374 B1 | 11/2004 | Karimi et al. | |
| 6,862,335 B2 | 3/2005 | Basu et al. | |
| 8,115,486 B2 * | 2/2012 | Habara et al. | 324/318 |
| 2007/0269000 A1 * | 11/2007 | Partain et al. | 378/37 |
| 2008/0118022 A1 * | 5/2008 | Hagiwara | 378/4 |
| 2008/0130823 A1 * | 6/2008 | Hagiwara | 378/4 |
| 2011/0129055 A1 * | 6/2011 | Neuser et al. | 378/4 |

FOREIGN PATENT DOCUMENTS

| | | | |
|---|---|---|---|
| WO | 2007039841 A2 | 4/2007 | |
| WO | 2007150037 A2 | 12/2007 | |

OTHER PUBLICATIONS

Frost A et al: "Iterative discrete steering of three-dimensional reconstructions from X-ray images with limited angle", VISAPP 2012—Proceedings of the International Conference on Computer Vision Theory and Applications 2012 Inst. for Syst. and Technol. of Inf. Cont, vol. 1, Feb. 22, 2012, pp. 89-94, XP009168754.

Anja Frost et al: "Discrete Steering: Eine statistisch orientierte Diskretisierung von dreidimensionalen Rekonstruktionen aus Roentgenaufnahmen" In "Forum Bildverarbeitung", Nov. 8, 2010, KIT Scientific Publishing, Karlsruhe, XP055059478, pp. 365-376.

Search Report and Written Opinion from PCT/US2013/027130 dated Apr. 12, 2013.

\* cited by examiner

*Primary Examiner* — Nancy Bitar
(74) *Attorney, Agent, or Firm* — Hiscock & Barclay LLP (57) ABSTRACT

A method for determining confidence values for volume units includes acquiring real projections of an object in a tomography system, reconstructing an image of the object from the real projections, generating artificial projections, for each volume unit comparing the real projections with the artificial projections and generating a confidence measure for each of the volume units.

7 Claims, 8 Drawing Sheets

SYSTEM AND METHOD FOR DETERMINING CONFIDENCE MEASUREMENTS OF SINGLE VOLUME ELEMENTS IN COMPUTER TOMOGRAPHY

BACKGROUND OF THE INVENTION

The subject matter disclosed herein relates to computer tomography, and more particularly to determining quality of individual voxels in volumetric models.

Tomography refers to imaging by sections or sectioning, through the use of any kind of penetrating wave, such as x-rays. A device used in tomography is called a tomograph, while the image produced is a tomogram. There are two basic steps in tomography: 1) acquisition of x-ray projections of an object; and 2) reconstruction of the captured x-ray projections to create a volumetric representation of the object, in which the volume is constructed of "voxels". A voxel (volumetric pixel or, more correctly, Volumetric Picture Element) is a volume element, representing a value on a regular grid in three-dimensional space. This is analogous to a pixel, which represents 2D image data in a bitmap (which is sometimes referred to as a pixmap).

During the acquisition phase, x-rays are emitted by an x-ray source from a focal spot, some of which penetrate the object. X-rays that penetrate the object are partially absorbed by the object. A detector records the x-rays and generates x-ray projections as digital images. The x-ray projections are usually saved on a computer hard drive or more generally in a computer memory. A detector can include a two dimensional array or a one dimensional array of pixels. Usually, to create a set of x-ray projections, the object is rotated at discrete intervals over 360° using the manipulation system, and at every rotational position one x-ray projection is generated. It is also possible to rotate the object over less than 360° or to rotate the object continuously.

During the reconstruction phase, the recorded x-ray projections are used to calculate the volume. Commonly used methods for reconstruction include but are not limited to: filtered backprojection, Feldkamp-Davis-Kress (FDK) iterative techniques (e.g., algebraic reconstruction technique (ART), simultaneous algebraic reconstruction technique (SART), and statistical methods (e.g., maximum-likelihood expectation-maximization (ML-EM)).

As described above, voxels are comparable to pixels but have x-y-z coordinates instead of x-y coordinates. In addition, each voxel describes the x-ray absorption coefficient at corresponding object position. Currently there is no suitable method for determining the quality of a voxel or how well a voxel is reconstructed (i.e., voxel confidence). There can be situations where artifacts can't be distinguished from real failures and details in the reconstructed volume. This leads to misinterpretation and detection problems with automated analysis algorithms.

BRIEF DESCRIPTION OF THE INVENTION

According to one aspect of the invention, a method for determining confidence values for volume units is described. The method includes acquiring real projections of an object in a tomography system, reconstructing an image of the object from the real projections, generating artificial projections, for each volume unit comparing the real projections with the artificial projections and generating a confidence measure for each of the volume units.

According to another aspect of the invention, a computer program product for method for determining confidence values for volume units is described. The computer program product includes a non-transitory computer readable medium storing instructions for causing a computer to implement a method. The method includes acquiring real projections of an object in a tomography system, reconstructing an image of the object from the real projections, generating artificial projections, for each volume unit comparing the real projections with the artificial projections and generating a confidence measure for each of the volume units.

According to yet another aspect of the invention, a system for determining confidence values for volume units is described. The system includes a source, an object configured to receive waves from the wave source, an image detector configured to record attenuated waves that generate real projections from the object, a computing system coupled to the wave source and the image detector, a wave controller coupled to the wave source and to the computing system, a manipulation controller coupled to the object and to the computing system, a data acquisition module coupled to the image detector and to the computing system and a process residing on the computing system configured to acquire the real projections from the image detector, reconstruct an image of the object from the real projections, generate artificial projections, for each volume unit compare the real projections with the artificial projections and generate a confidence measure for each of the volume units.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
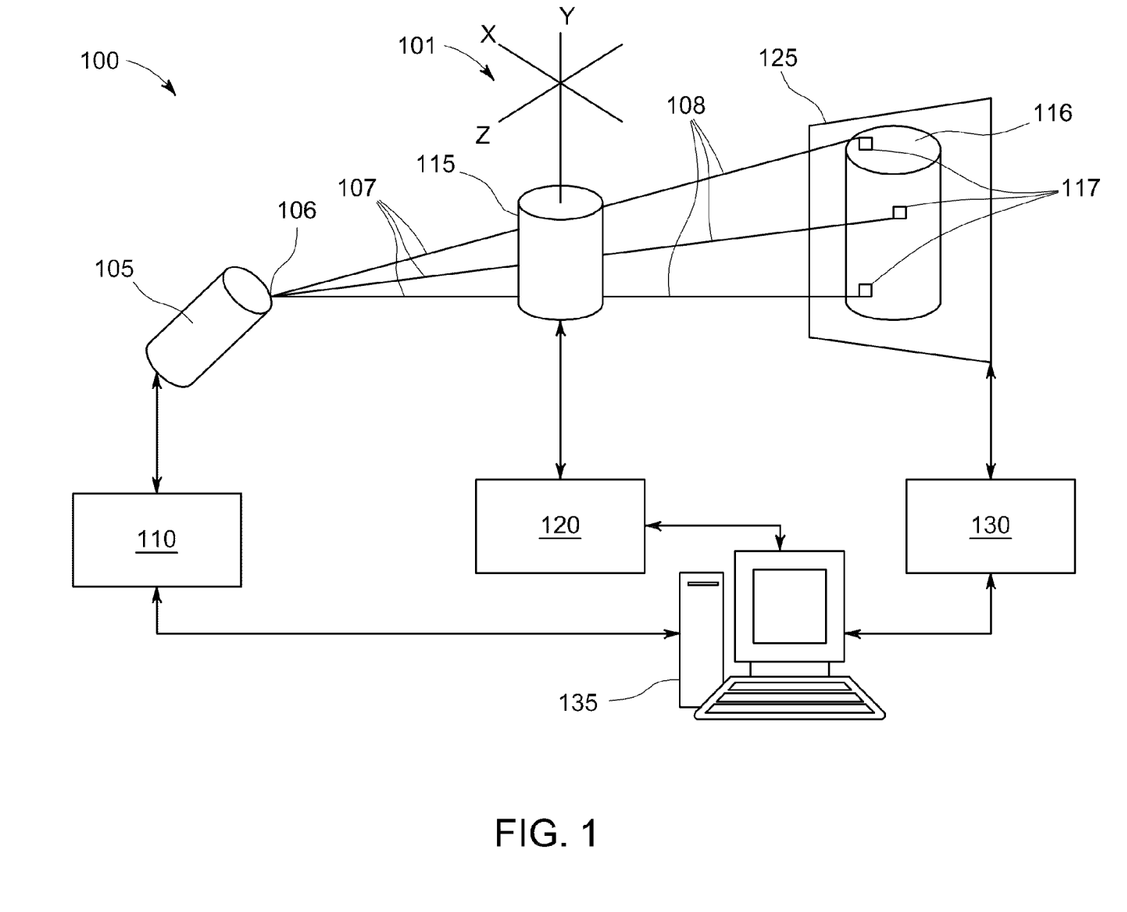
FIG. 1 illustrates a system for determining confidence measurements of single volume elements in computed tomography.

FIG. 1 illustrates a system 100 for determining confidence measurements of single volume elements in computed tomography. For illustrative purposes x-ray waves are discussed in exemplary embodiments. It will be appreciated that any other penetrating wave such as but not limited to microwaves, sound waves, x-rays, eddy current and electromagnetic waves are contemplated in other exemplary embodiments. The system 100 includes an x-ray source 105 having a focal spot 106 from which x-ray beams 107 are emitted. The x-ray source 105 is controlled by an x-ray controller 110. The system 100 further includes an object 115 through which the x-ray beams 107 pass, and from which attenuated x-ray beams 108 pass. The object 115 is coupled to a manipulation controller 120 that rotates the object 115 through several positions in an x-y-z coordinate system 101. The system 100 further includes an x-ray detector 125 onto which projections 116 of the object 115 are displayed. The attenuated x-ray beams 108 generate individual pixels 117 on the detector 125. The individual pixels 117 represent attenuated values from the attenuated x-ray beams 108 as further described herein. The system 100 further includes a data acquisition module 130 for collecting the acquired data (e.g., pixel 117 data) from the detector 125. A computing system 135 is coupled to the x-ray controller 110 to control the generation of the x-ray beams 107. The computing system 135 is also coupled to the manipulation controller 120 to control the rotation of the object 115. The computing system 135 is further coupled to the data acquisition module 130 for acquiring, storing and manipulating the acquired data as further described herein.

Figure 2:
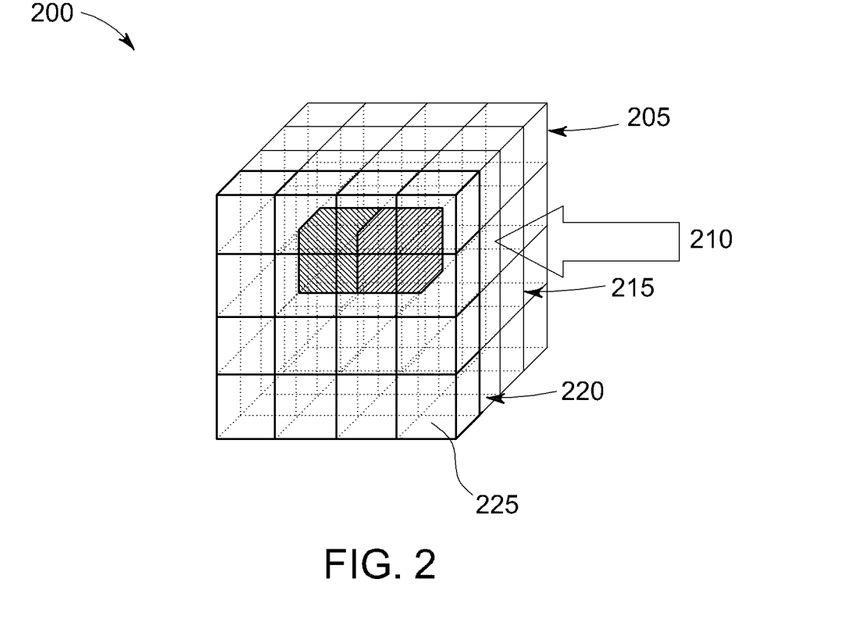
FIG. 2 illustrates an example of a volume that can be acquired by the system of FIG. 1.

FIG. 2 illustrates an example of a volume 200 that can be acquired by the system 100 of FIG. 1. The volume 200 represents a reconstructed image of an object (e.g., the object 115) that can be generated from various techniques described herein. The object 115 is illustrated generically as a cylinder. It will be appreciated that the object 115 can be any object to be evaluated. In the example, the volume 200 includes four volume slices 205, 210, 215, 220. Each of the volume slices 205, 210, 215, 220 includes voxels, such as a voxel 225. As such, each of the volume slices 205, 210, 215, 220 includes sixteen voxels, and the volume 200 has sixty four voxels. It will be appreciated that the example of FIG. 2 is a simplified example and that reconstructed image can include varying voxel numbers.

The system 100 provides quantitative information about the reconstruction quality/error of single volume elements without taking further external information into account. In exemplary embodiments, the system 100 can automatically define the confidence interval. Alternatively, the user can define the confidence interval. The system 100 can implement several methods to determine the quality of each volume element (i.e., voxel) of the reconstructed data set. A voxel confidence map is then generated from the internal process data of the reconstruction.

The methods described herein are not tied to a specific technique for calculating the representation (e.g., ART, SART, ML-EM and FDK). As such, different techniques can be compared on a uniform basis when considering voxel confidence. Furthermore, the probability distribution affords stochastic methods to fuse representations of several techniques to the resulting representation.

Figure 3:
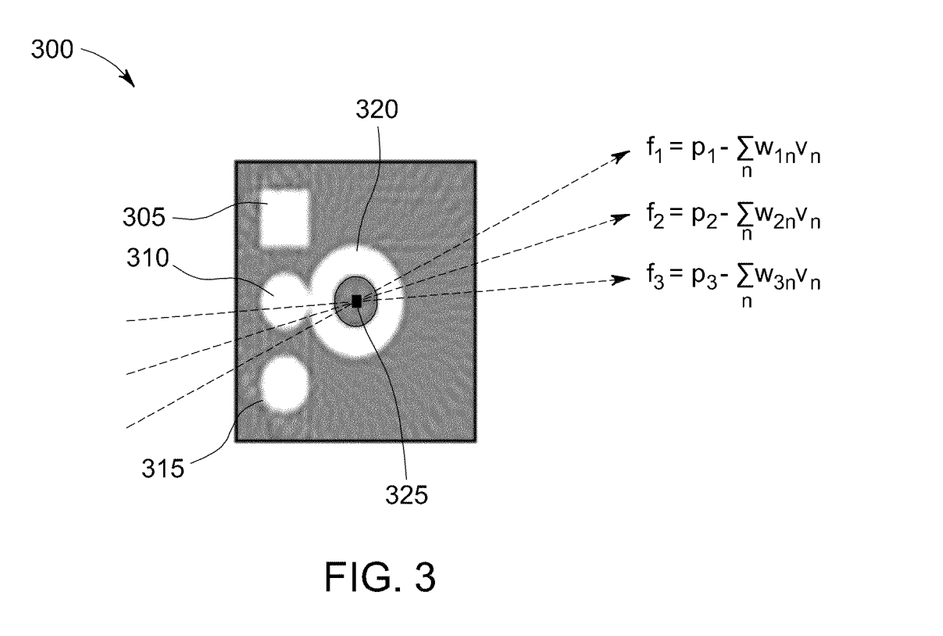
FIG. 3 illustrates an individual volume slice.

The methods described herein measure the confidence of the reconstructed voxel density by the projection data. In exemplary embodiments, measurement of the confidence of the reconstructed voxel density by the projected data can be attained by calculating the deviation between real projection data and artificial projection data. As such, as further described herein, as real projections (i.e., real pixel values) are acquired, forward projection is implemented to also calculate artificial pixel values for corresponding to each acquired pixel value. FIG. 3 illustrates an individual volume slice 300 (e.g., one of volume slices 205, 210, 215, 220 of FIG. 2). The volume slice includes several objects 305, 310, 315, 320 each made up from voxels such as a voxel 325 ($v_j$). Each voxel, including the voxel 325 is calculated from real pixel values from several passes of x-ray beams, represented by $ray_i$. Computation of error, that is a deviation between each real pixel value and a summation of artificial pixel values from forward projection, is performed. For every pixel in the projection images, an error measure, $f_i$, is computed:

$$f_i = p_i - \sum_n w_{in} v_n \qquad (1)$$

Figure 4:
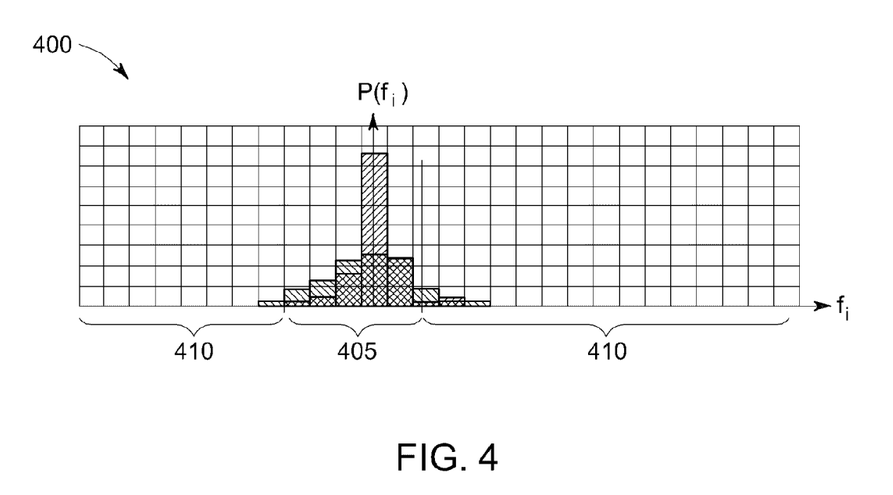
FIG. 4 illustrates a probability distribution plot for "good" and "bad" voxels.

Here, $p_i$ is the pixel value in the projection data, $v_n$ is the voxel density in the volumetric data, and $w_{in}$ is a weighting factor. The weighting factor is a value selected that determines the influence a particular voxel in the voxel density $v_n$ on the particular ith ray, $ray_i$, that passes through the voxel. The sum over all n for $w_{in} v_n$ is an artificial pixel value, calculated from all voxels in the voxel density $v_n$ through which the each $ray_i$ passed. In this way forward projection is implemented to generate the artificial pixel data. As described herein, for every real pixel value acquired, the deviation is calculated based on the artificial pixel value computed with forward projection. A histogram of the error measure values $f_i$ is computed for the voxel $v_j$, and the histogram is converted to a probability distribution, which determines the confidence value of the voxel, $v_j$. FIG. 4 illustrates a probability distribution plot 400 of probability density, $P(f_i)$ versus error measure, $f_i$, for "good" and "bad" voxels. A voxel can be determined to be "good" if the correspondent probability distribution of $f_i$ falls within a confidence interval 405. As such, the probability distribution represents the confidence measure. If a significant part of the probability distribution falls in other intervals 410, 415 the correspondent voxel can be considered as "bad". This is illustrated in the plot 401. The confidence interval can be selected prior to the distribution. It will be appreciated that the selection of "good" and "bad" voxels tells the user a measure of quality of the resulting volumetric representation. As can be appreciated in FIG. 4, high confidence values include a distribution that is tall relative to the width, and the lower confidence values are relatively shorter and wider. It will be appreciated that predetermined values can be selected by a user or automatically by the system 100.

Figure 5:
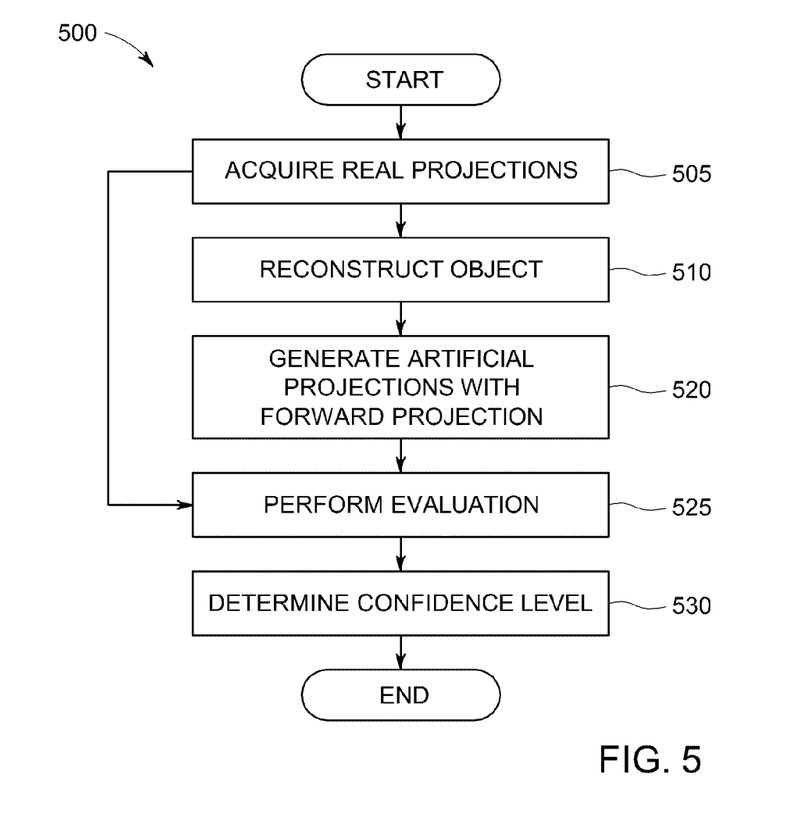
FIG. 5 illustrates a flow chart for a method of determining confidence measurements in accordance with exemplary embodiments.

FIG. 5 illustrates a flow chart for a method 500 of determining confidence measurements in accordance with exemplary embodiments. At block 505, the system 100 acquires real projections. Many one dimensional or two dimensional x-ray images are taken via the detector 125. As described herein, the real projections include many pixels. Each pixel represents a value that corresponds to the attenuation of the corresponding x-ray beams 107, that are emitted from the focal spot 106 and hits that pixel on the detector 125. Once all projections are acquired, at block 510, the system 100 reconstructs the volume slices of the object 115 from the x-ray projections. Reconstruction is a mathematical computing method that generates volume slices from x-ray images. Several examples of reconstruction algorithms have been described herein including, but not limited to: filtered back-projection, FDK, iterative techniques such as ART and SART and statistical methods such as ML-EM. It will be appreciated that any reconstruction algorithm can be implemented. At least one of more slices represents a volumetric image of a real object. As described herein, each slice includes a number of voxels that each represents an attenuation coefficient at the corresponding position in the real object 115. At block 520, the system 100 generates artificial projections via forward projection. Forward projection thus generates artificial projection data from volume slices using the geometric projection models of the system 100. The artificial projections can be one dimensional or two dimensional artificially computed images that include several pixels. At block 525, the system 100 performs an evaluation for every voxel $v_j$, by comparing the real projections acquired at block 505 with the artificial projections computed at block 520. The system 100 further computes the histograms and probabilities in the confidence intervals (see FIG. 4) as a confidence measure for each voxel $v_j$. It will be appreciated that the system 100 stores each of the acquired real projections, the artificial projections, and the confidence data (e.g., probability distributions). At block 530, the system 100 determines the confidence levels from the probability distributions. Each voxel is assigned a confidence measure. The entity of confidence measures over all voxels results in confidence measure distribution for all volume slices. The confidence measure can also be saved in the system 100 and displayed for a user as further described herein.

Figure 6:
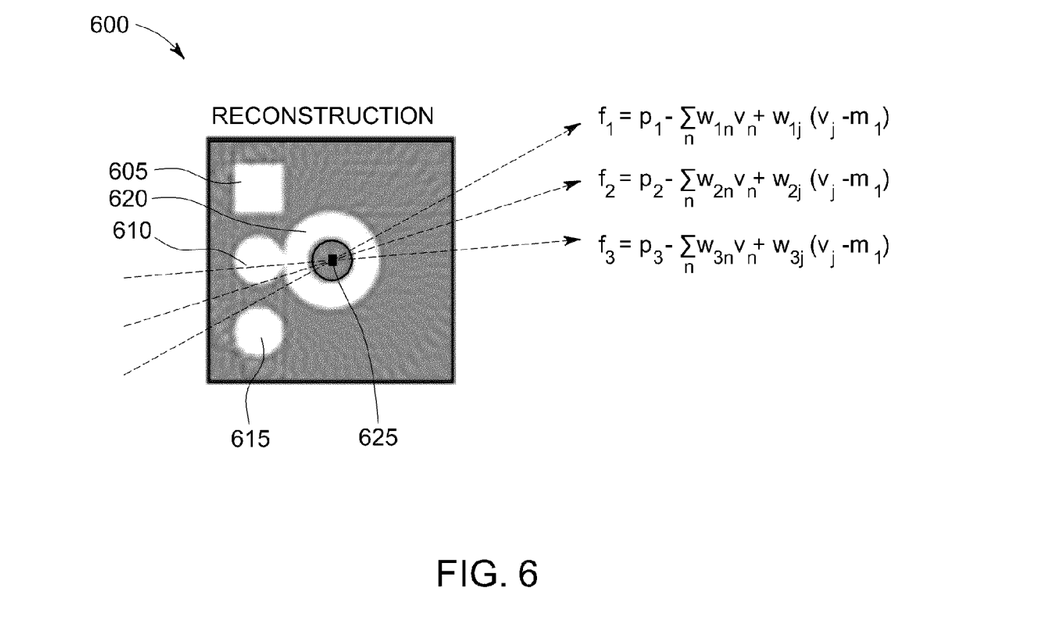
FIG. 6 illustrates an individual volume slice.
Figure 7:
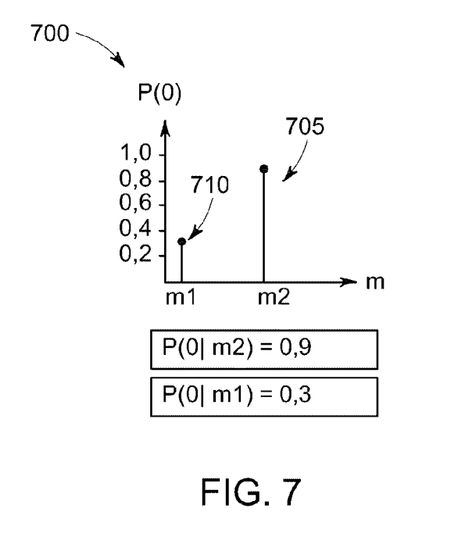
FIG. 7 illustrates an example of a probability distribution plot for "good" and "bad" voxels according to the selected material.
Figure 8:
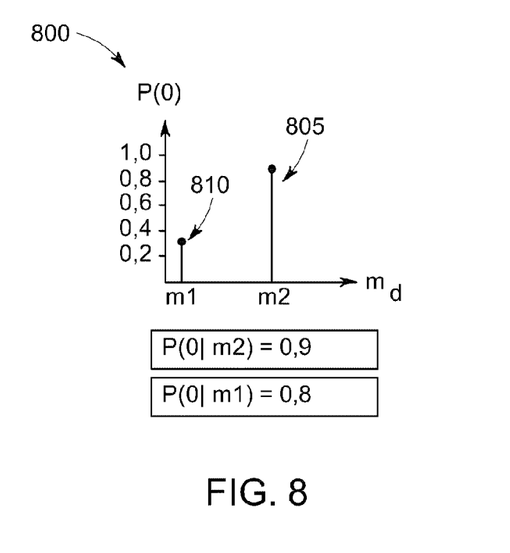
FIG. 8 illustrates an example of a probability distribution plot for voxels with low confidence values.

In exemplary embodiments, the reconstructed voxel density can also be varied and exchanged with a predefined density value (e.g., material and air, alternatingly). The method can also be easily extended for usage with more than just two predefined densities (e.g. air, material1, material2 and the like). The systems and methods described herein measure the support of each of the predefined densities by the projection data based on calculation of the histogram and probability calculation in the confidence interval 405. The measure for the support can be expressed as the probability for material (Pm) and air (Pa). As described further herein, the systems and methods described herein implement probabilistic evidence theory (e.g., Dempster-Shafer-Theory). The probabilistic theory is also used to measure and to consider conflicts for the support of different predefined density values (e.g., if both material and air have the same support in the projection data, the conflict is high and thus, the confidence for this voxel is low). FIG. 6 illustrates an individual volume slice 600 (e.g., one of volume slices 205, 210, 215, 220 of FIG. 2). The volume slice includes several objects 605, 610, 615, 620 each made up from voxels such as a voxel 625 ($v_j$). Each voxel, including the voxel 625 includes real pixel values from several passes of x-ray beams, represented by $ray_i$. Computation of error, that is a deviation between each real pixel value and a summation of artificial pixel values from forward projection, is performed. For every pixel in the projection images, an error measure:

$$f_i = p_i - \sum_n w_{in} v_n + w_{ij}(v_j - m_x)) \qquad (2)$$

is computed. Here, p, is the pixel value in the projection data, is the voxel density in the volumetric data, and $w_{in}$ is a weighting factor. The weighting factor is a value selected that determines the influence of a particular voxel in the voxel density $v_n$ n the particular ray, that passes through the voxel. The sum over all n for $w_{in}v_n$ is an artificial pixel value, calculated from all voxels in the voxel density $v_n$ through which the each ray, passed. In exemplary embodiments, an additional artificial value, $w_{ij}(v_j-m_x)$ is added to the summation. The voxel $v_j$ is adjusted by the density value of the voxels through which the individual x-ray beams, $ray_i$, pass. For example, x may have two values, x=1 for air and x=2 for the material of the object 115 under test. In exemplary embodiments, a histogram can be constructed from equation (2) for the $m_1$ values for the voxel $v_j$. The histogram can then be converted to a probability distribution. The same steps are repeated for $m_2$, that is, first a histogram is constructed from equation (2) for the $m_2$ values for the voxel $v_j$, and can then be converted to a probability distribution. A confidence measure can then be calculated for each of $m_1$ and $m_2$ to attain values $P(0|m_1)$ and $P(0|m_2)$, respectively. These values can be understood as probability that the material $m_1$ and $m_2$ are the right ones. FIG. 7 illustrates a probability distribution plot 700 for a voxel according to the substituted materials $m_1$ and $m_2$. The probability distribution is calculated from histograms like in FIG. 4. In exemplary embodiments, a voxel can be "good" when one of the probability for one of the materials is higher relative to the other probability for the other material. In the example in FIG. 7, the probability 705 for the material $m_2$ has a better confidence value than the probability 710 for the material $m_1$. As such, the user or the system 100 can select that material associated with the probability 705 is more probable than the material associated with probability 710. This voxel can also be considered as a "good" voxel. FIG. 8 illustrates another probability distribution plot 800 for voxels with low confidence values. In the example in FIG. 8, the probabilities 805, 810 for both the materials $m_2$, $m_1$ are relatively close to one another. This example would be considered a conflict situation where both materials are supported equally by the projections. This voxel can also be considered as a "bad" voxel. It will be appreciated that the user can select predetermined spread values between the probability distributions to determine whether a voxel is "good" or "bad" and whether there is a conflict situation.

Figure 9:
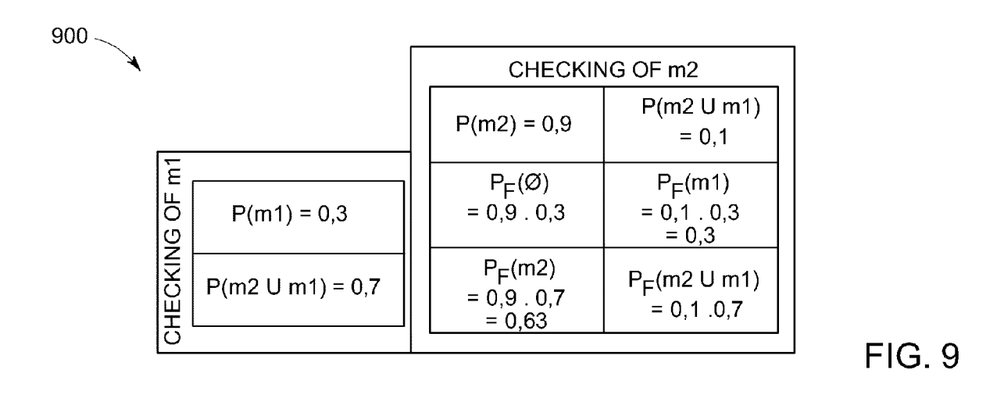
FIG. 9 illustrates and example of an intersection table.
Figure 10:
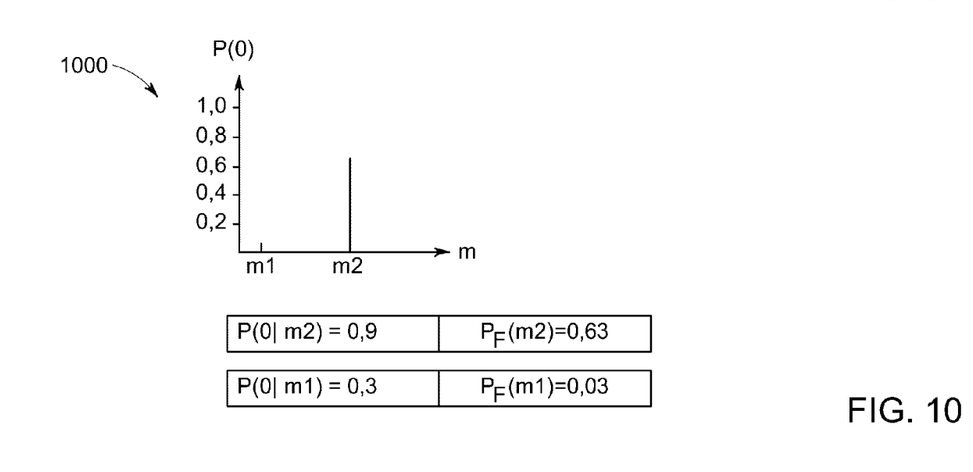
FIG. 10 illustrates an example of a probability distribution plot for "good" and "bad" voxels.

In exemplary embodiments, evidence theory (e.g., Dempster-Shafer theory) can determine whether the voxels are "good" or "bad". For the results of the probability distribution in FIG. 7, for the material $m_2$, the probability of the union of $m_2$ and $m_1$ can be computed, that is, the probability of $P(m_2 \cup m_1)=1-P(0|m_2)=0,1)$. Similarly, for the material $m_1$, the probability of the union of $m_2$ and $m_1$ can be computed, that is, the probability of $P(m_2 \cup m_1)=1-P(0|m_1)=0,7)$. For both materials an intersection table can be constructed. FIG. 9 illustrates an intersection table 900 illustrating the intersections for the probability distributions from both Dempster-Shafer theory and evidence theory. FIG. 10 illustrates a probability distribution plot 1000 for "good" and "bad" voxels according to the selected material, with the probability distributions $P_F$ extracted from the intersection table. The distribution plot provides further evidence that the voxel related to the material $m_2$ is a "good" voxel.

Figure 11:
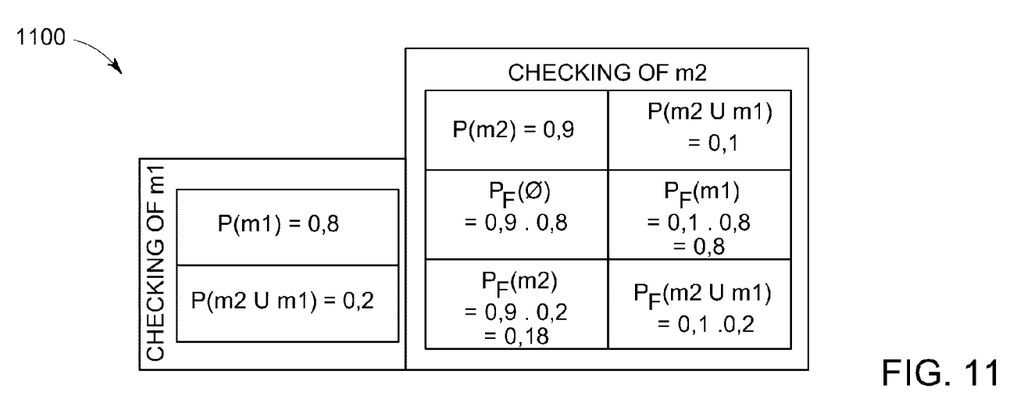
FIG. 11 illustrates an example of an intersection table.
Figure 12:
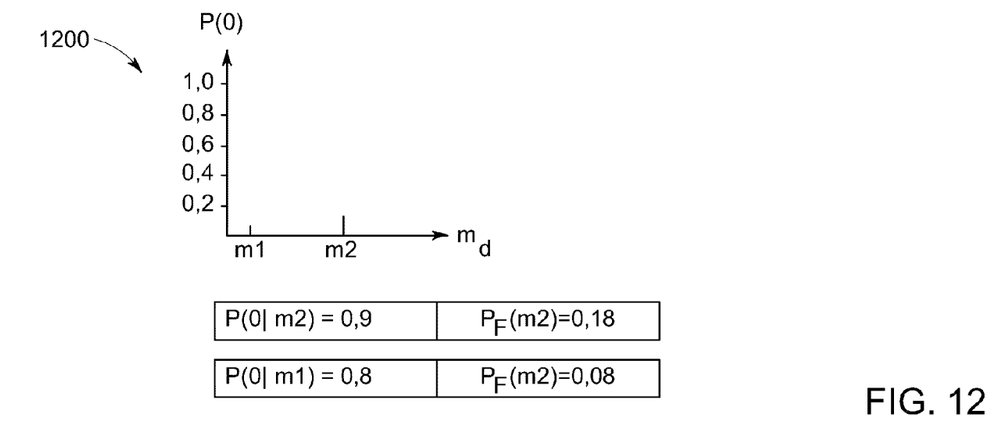
FIG. 12 illustrates an example of a probability distribution plot in which the probability distributions for both the materials $m_2$, $m_1$ are relatively close to one another.

For the results of the probability distribution in FIG. 8, for the material $m_2$, the probability of the union of $m_2$ and $m_1$ can be computed, that is, the probability of $P(m_2 \cup m_1)=1-P(0|m_2)=0,1$. Similarly, for the material $m_1$, the probability of the union of $m_2$ and $m_1$ can be computed, that is, the probability of $P(m_2 \cup m_1)=1-P(0|m_1)=0,2$. For both materials an intersection table can be constructed. FIG. 11 illustrates an intersection table 1100 illustrating the intersections for the probability distributions from both Dempster-Shafer theory and evidence theory. FIG. 12 illustrates a probability distribution plot 1200 in which the probability distributions for both the materials $m_2$, $m_1$ are relatively close to one another, and with the probability distributions $P_F$ extracted from the intersection table. The distribution plot provides further evidence that this example would be considered a conflict situation.

Figure 13:
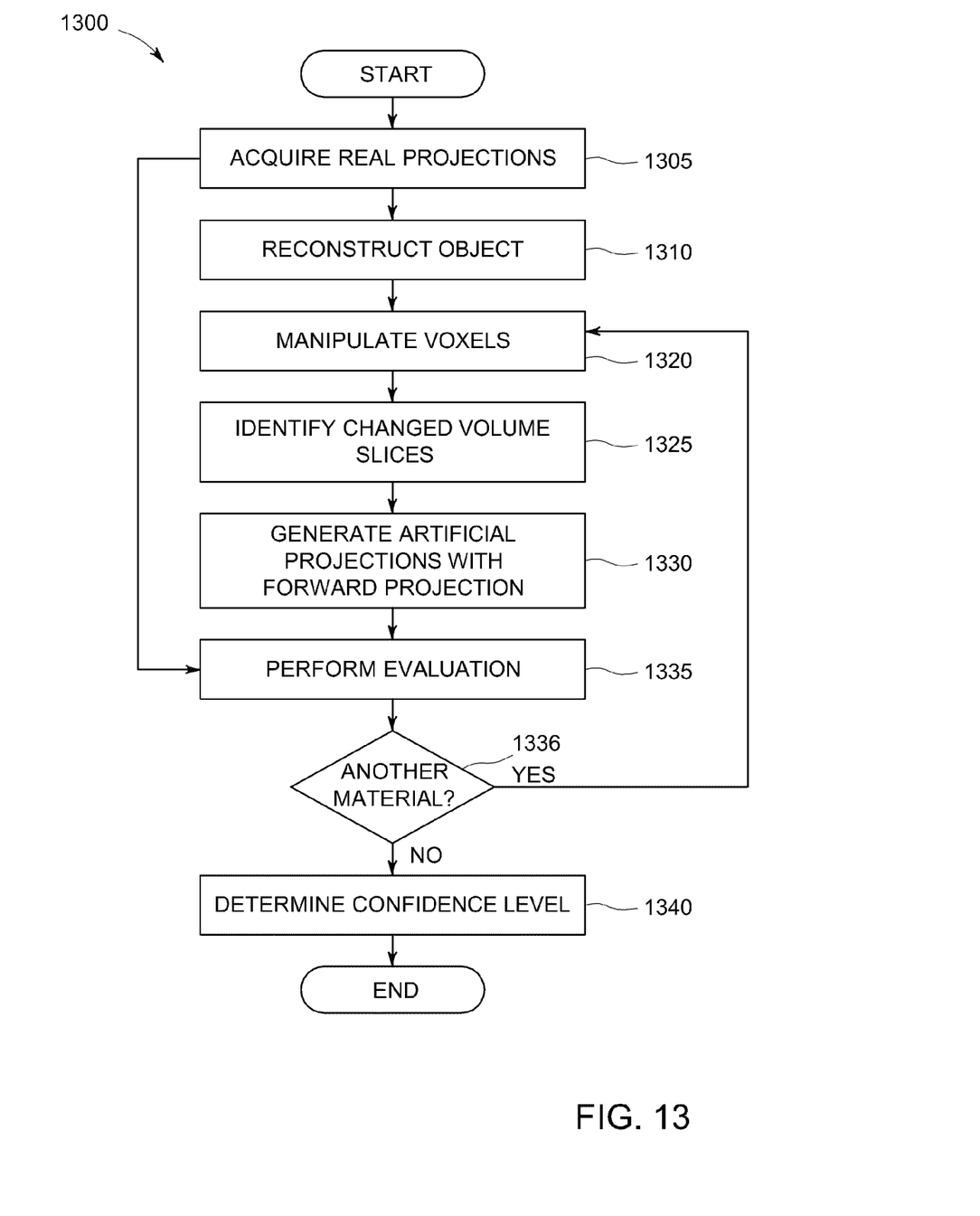
FIG. 13 illustrates a flow chart for a method of determining confidence measurements in accordance with exemplary embodiments.

FIG. 13 illustrates a flow chart for a method 1300 of determining confidence measurements in accordance with exemplary embodiments. At block 1305, the system 100 acquires real projections. Many one dimensional or two dimensional x-ray images are taken via the detector 125. As described herein, the real projections include many pixels. Each pixel represents a value that corresponds to the attenuation of the corresponding x-ray beams 107, that are emitted from the focal spot 106 and hits that pixel on the detector 125. Once all projections are acquired, at block 1310, the system 100 reconstructs the image of the object 115 from the x-ray images. Reconstruction is the mathematical computing method that generates volume slices from x-ray images. Several examples of reconstruction algorithms have been described herein including, but not limited to: filtered backprojection, FDK, iterative techniques such as ART and SART and statistical methods such as ML-EM. It will be appreciated that any reconstruction algorithm can be implemented. At least one of more slices represents a volumetric image of a real object. As described herein, each slice includes a number of voxels that each represents an attenuation coefficient at the corresponding position in the real object 115. At block 1320, the individual voxels can be manipulated such as described above with respect to material density values. In exemplary embodiments, every single voxel can be set to a predefined specific value. The predefined specific value can be a material density value gained from apriori knowledge as described herein. To compute confidence measure distribution for a given volume it may be necessary to repeat this step many times as described above. At least one of more slices represents a volumetric image of a real object but with manipulated voxels. The changed volume slices are used in the calculation for the probability distributions as described herein, but are not necessarily used in the reconstruction of the projections 116. At block 1330, the system 100 generates artificial projections via forward projection. Forward projection thus generates artificial projection data from volume slices using the geometric projection models of the system 100. The artificial projections can be one dimensional or two dimensional artificially computed images that include several pixels. At block 1335, the system 100 performs an evaluation for every voxel $v_j$, by comparing the real projections acquired at block 1305 with the artificial projections computed at block 1330. The system 100 further computes the histograms and probabilities in the confidence intervals as a confidence measure for each voxel $v_j$. The system 100 further applies the Dempster-Shafer and evidence theories and from the computation of the Dempster-Shafer and evidence theories, computes the confidence measure of the voxels (see FIGS. 7-12). It will be appreciated that the system 100 stores each of the acquired real projections, the artificial projections, and the confidence data (e.g., probability distributions). The system 100 can perform the voxel manipulations at block 1320 and forward projection at block 1330 multiple times depending on the number and types of materials under evaluation. As such, at block 1336, the system 100 determines if there is an additional material to consider. If there is an additional material to consider at block 1336, then the system repeats the method 1300 beginning at block 1320. At block 1340, the system 100 determines the confidence levels from the probability distributions. Each voxel is assigned a confidence measure. The entity of confidence measures over all voxels results in confidence measure distribution for all volume slices. The confidence measure can also be saved in the system 100 and displayed for a user as further described herein.

Figure 14:
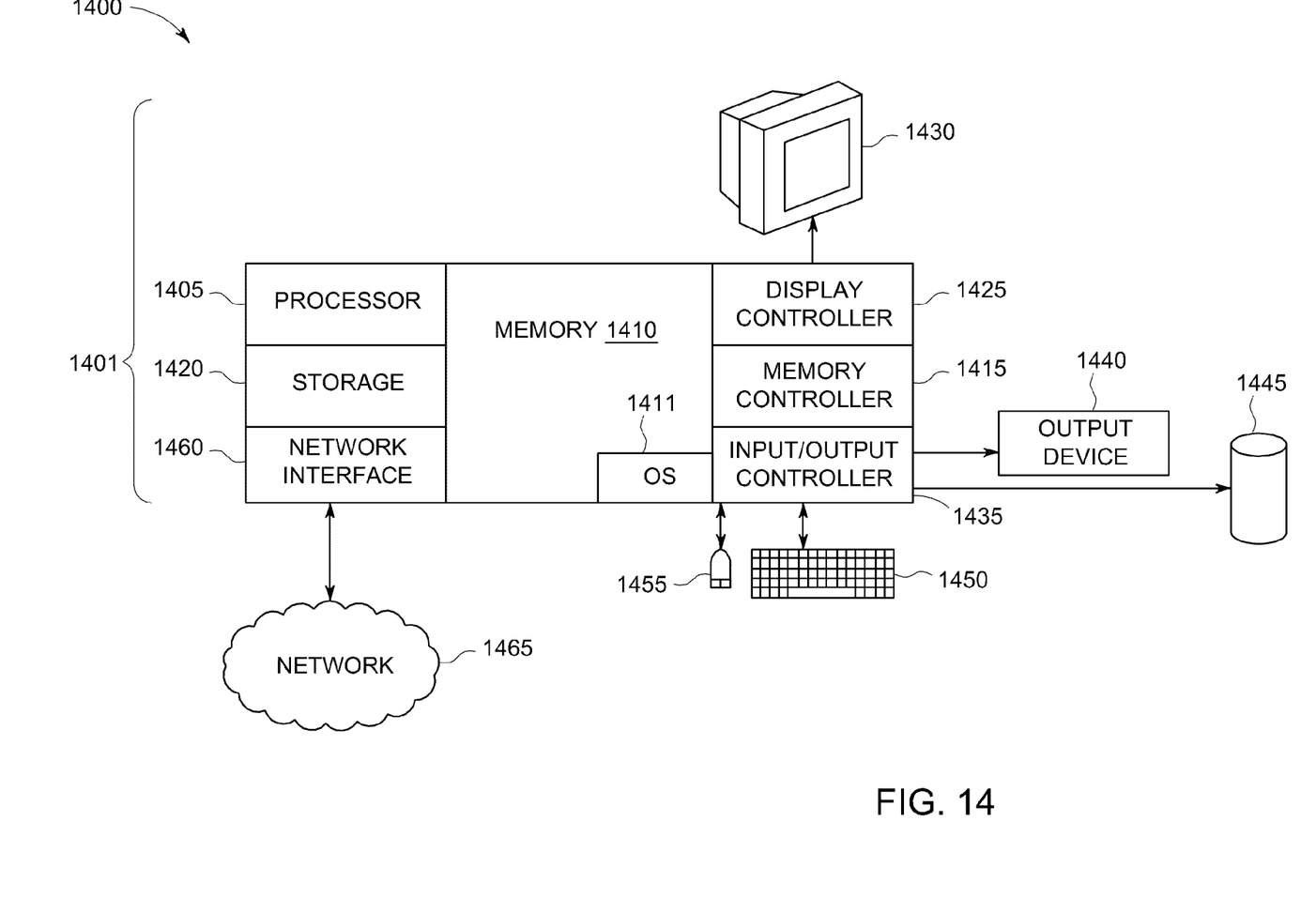
FIG. 14 illustrates an exemplary embodiment of a computing system that can be used in determining confidence measurements of single volume elements in computed tomography.

The computing system 135 of FIG. 1 can be any suitable computing device as now described. FIG. 14 illustrates an exemplary embodiment of a computing system 1400 that can be used in determining confidence measurements of single volume elements in computed tomography. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1400 therefore includes general-purpose computer 1401.

In exemplary embodiments, in terms of hardware architecture, as shown in FIG. 14, the computer 1401 includes a processor 1405, memory 1410 coupled to a memory controller 1415, and one or more input and/or output (I/O) devices 1440, 1445 (or peripherals) that are communicatively coupled via a local input/output controller 1435. The input/output controller 1435 can be, but is not limited to, one or more buses or other wired or wireless connections, as is known in the art. The input/output controller 1435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1405 is a hardware device for executing software, particularly that stored in memory 1410. The processor 1405 can be any custom made or commercially available processor, a central processing unit (CPU), an auxiliary processor among several processors associated with the computer 1401, a semiconductor based microprocessor (in the form of a microchip or chip set), a macroprocessor, or generally any device for executing software instructions.

The memory 1410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1410 may incorporate electronic, magnetic, optical, and/or other types of storage media. Note that the memory 1410 can have a distributed architecture, where various components are situated remote from one another, but can be accessed by the processor 1405.

The software in memory 1410 may include one or more separate programs, each of which comprises an ordered listing of executable instructions for implementing logical functions. In the example of FIG. 14, the software in the memory 1410 includes the confidence measurement methods described herein in accordance with exemplary embodiments and a suitable operating system (OS) 1411. The OS 1411 essentially controls the execution of other computer programs, such the confidence measurement systems and methods as described herein, and provides scheduling, input-output control, file and data management, memory management, and communication control and related services.

The confidence measurement methods described herein may be in the form of a source program, executable program (object code), script, or any other entity comprising a set of instructions to be performed. When a source program, then the program needs to be translated via a compiler, assembler, interpreter, or the like, which may or may not be included within the memory 1410, so as to operate properly in connection with the OS 1411. Furthermore, the confidence measurement methods can be written as an object oriented programming language, which has classes of data and methods, or a procedure programming language, which has routines, subroutines, and/or functions.

In exemplary embodiments, a conventional keyboard 1450 and mouse 1455 can be coupled to the input/output controller 1435. Other output devices such as the I/O devices 1440, 1445 may include input devices, for example but not limited to a printer, a scanner, microphone, and the like. Finally, the I/O devices 1440, 1445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 1440, 1445 further include the x-ray controller 110, the manipulation controller 120 and the data acquisition module 130 of FIG. 1. The system 1400 can further include a display controller 1425 coupled to a display 1430. In exemplary embodiments, the system 1400 can further include a network interface 1460 for coupling to a network 1465. The network 1465 can be an IP-based network for communication between the computer 1401 and any external server, client and the like via a broadband connection. The network 1465 transmits and receives data between the computer 1401 and external systems. In exemplary embodiments, network 1465 can be a managed IP network administered by a service provider. The network 1465 may be implemented in a wireless fashion, e.g., using wireless protocols and technologies, such as WiFi, WiMax, etc. The network 1465 can also be a packet-switched network such as a local area network, wide area network, metropolitan area network, Internet network, or other similar type of network environment. The network 1465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1401 is a PC, workstation, intelligent device or the like, the software in the memory 1410 may further include a basic input output system (BIOS) (omitted for simplicity). The BIOS is a set of essential software routines that initialize and test hardware at startup, start the OS 1411, and support the transfer of data among the hardware devices. The BIOS is stored in ROM so that the BIOS can be executed when the computer 1401 is activated.

When the computer 1401 is in operation, the processor 1405 is configured to execute software stored within the memory 1410, to communicate data to and from the memory 1410, and to generally control operations of the computer 1401 pursuant to the software. The confidence measurement methods described herein and the OS 1411, in whole or in part, but typically the latter, are read by the processor 1405, perhaps buffered within the processor 1405, and then executed.

When the systems and methods described herein are implemented in software, as is shown in FIG. 14, the methods can be stored on any computer readable medium, such as storage 1420, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the confidence measurement methods are implemented in hardware, the confidence measurement methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include but are not limited to providing a display of confidence level with indicators such as color coding. The systems and methods described herein also provide a user with a confidence level indicating the quality of a voxel in an acquired image. Utilization of the confidence information increases the reconstruction quality within an iterative reconstruction algorithm.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for determining confidence values for voxels, the method comprising:
   a) acquiring real projections of an object in a tomography system, wherein each real projection includes a plurality of pixel values, each pixel value corresponding to a respective penetrating-wave beam; and
   reconstructing an image of the object from the real projections, the image including a plurality of the voxels;
   b) generating a confidence value for each of the voxels by:
   computing a manifold of error measures for different penetrating-wave beams through the voxel, wherein each of the manifold of error measures is computed for one of the pixel values as a difference between the one of the pixel values and a summation of a product of a weighting factor and respective voxel values for voxels through which the respective penetrating-wave beam passes;
   building a histogram from the manifold of error measures;
   converting the histogram to a probability distribution; and
   deriving a characteristic value from this probability distribution.

2. The method as claimed in claim 1 wherein the object is represented by volume slices.

3. The method as claimed in claim 2 wherein reconstructing the image of the object from the real projections comprises generating the volume slices from the real projections.

4. The method as claimed in claim 1 wherein the characteristic value is derived through an integration of the probability distribution within an interval.

5. The method as claimed in claim 4 wherein the confidence measure is derived from the characteristic value.

6. A computer program product embodied on a non-transitory computer readable medium having instructions stored thereon to cause a computer to perform steps of a method for determining confidence values for volume units, the method comprising:
   a) acquiring real projections of an object in a tomography system, wherein each real projection includes a plurality of pixel values, each pixel value corresponding to a respective penetrating-wave beam;
   b) generating a confidence measure for each of the volume units by:
   computing a manifold of error measures for different penetrating-wave beams through the voxel, wherein each of the manifold of error measures is computed for one of the pixel values as a difference between the one of the pixel values and a summation of a product of a weighting factor and respective voxel values for voxels through which the respective penetrating-wave beam passes;

building a histogram from the manifold of error measures;

converting the histogram to a probability distribution; and deriving a characteristic value from this probability distribution.

7. A system for determining confidence values for volume units, the system comprising:

a wave source;

an object configured to receive waves from the wave source;

an image detector configured to record attenuated waves that generate real projections from the object;

a computing system coupled to the wave source and the image detector;

a wave controller coupled to the wave source and to the computing system;

a manipulation controller coupled to the object and to the computing system; and a data acquisition module coupled to the image detector and to the computing system;

wherein the computing system is configured to:

acquire the real projections from the image detector; and generate a confidence measure for each of the volume units by:

computing a manifold of error measures for different penetrating-wave beams through the voxel, wherein each of the manifold of error measures is computed for one of the pixel values as a difference between the one of the pixel values and a summation of a product of a weighting factor and respective voxel values for voxels through which the respective penetrating-wave beam passes;

building a histogram from the manifold of error measures;

converting the histogram to a probability distribution; and deriving a characteristic value from this probability distribution.

* * * * *

UNITED STATES PATENT AND TRADEMARK OFFICE
CERTIFICATE OF CORRECTION

| | | |
|---|---|---|
| PATENT NO. | : 8,861,827 B2 | Page 1 of 1 |
| APPLICATION NO. | : 13/406841 | |
| DATED | : October 14, 2014 | |
| INVENTOR(S) | : Suppes et al. | |

It is certified that error appears in the above-identified patent and that said Letters Patent is hereby corrected as shown below:

In the Specification

Column 2, Line 58, delete "and" and insert -- an --, therefor.

Column 6, Line 9, delete "p," and insert -- $p_i$ --, therefor.

Column 6, Line 10, delete "data, is the" and insert -- data, $v_n$ is the --, therefor.

Column 6, Line 13, delete "n the particular ray," and insert -- on the particular $ray_i$ --, therefor.

Column 6, Line 16, delete "the each ray," and insert -- the each $ray_i$ --, therefor.

Signed and Sealed this
Twenty-third Day of June, 2015

Michelle K. Lee
*Director of the United States Patent and Trademark Office*